United States Patent [19]

Enomoto et al.

[11] 4,021,390

[45] May 3, 1977

[54] ALKYD RESIN COMPOSITION COMPRISING A 1,1-BIS(1'-METHYL-2'-VINYL-4',6'-HEPTADIENOXY)ALKANE

[75] Inventors: Satoru Enomoto, Fujisawa; Yutaka Mukaida, Tokyo; Mikiro Yanaka, Matsudo; Sadao Nishita, Tokyo; Hisayuki Wada, Tokyo; Hitoshi Takita, Tokyo, all of Japan

[73] Assignee: Kureha Kagaku Kogyo Kabushiki Kaisha, Tokyo, Japan

[22] Filed: June 17, 1976

[21] Appl. No.: 696,928

[30] Foreign Application Priority Data

June 20, 1975  Japan ............................. 50-74404

[52] U.S. Cl. .................. 260/22 CB; 260/23 P; 260/33.2 R
[51] Int. Cl.$^2$ ............................................. C09D 3/66
[58] Field of Search ......... 260/22 CB, 23 P, 33.2 R

[56] References Cited

UNITED STATES PATENTS

| 2,407,479 | 9/1946 | D'Alelio | 260/22 CB |
| 2,957,837 | 10/1960 | Smith et al. | 260/33.2 R |
| 3,433,753 | 3/1969 | Farkas et al. | 260/23 P |

Primary Examiner—Ronald W. Griffin
Attorney, Agent, or Firm—Lane, Aitken, Dunner & Ziems

[57] ABSTRACT

An alkyd resin composition including an alkyd resin and a 1,1-bis(1'-methyl-2'-vinyl-4',6'-heptadienoxy)alkane, useful as non-solvent type paint.

4 Claims, 3 Drawing Figures

ALKYD RESIN COMPOSITION COMPRISING A 1,1-BIS(1'-METHYL-2'-VINYL-4',6'-HEPTADIENOXY)ALKANE

FIELD OF THE INVENTION

The present invention relates to a novel alkyd resin composition which is useful as paint.

BACKGROUND OF THE INVENTION

Heretofore, alkyd resin paint of the so-called air curing type which dries at room temperature has been used in large quantities as the most common paint. However, for coating with this paint, a solvent must be used in order to increase the workability. The solvent is only required at the time of the coating. After the coating is applied, the solvent dissipates into the atmosphere. From the stand-point of air pollution control, safety for workers and saving of resources, therefore, the use of a volatile solvent is not always desirable. For this reason, there has been a need for the development of alkyd resin paint capable of coating without such a solvent.

SUMMARY OF THE INVENTION

An object of the present invention is, therefore, to provide an alkyd resin composition which can be used, as it is, at the time of the coating.

The above object and other objects of the present invention will be made clear from the descriptions given below.

The present invention is based on the recognition that if a liquid substance which is curable by the reaction with alkyd resin in air at room temperature is used as a diluent for alkyd resin paint, it will be unnecessary to use a solvent at the time of the coating. Accordingly our research was directed to the development of a reactive diluent bearing in mind that drying oils such as linseed oil, soya-bean oil and safflower oil, which are natural products, are raw materials used for the production of alkyd resin. However, study revealed that the drying oils were unsuitable for use as the paint diluent. This is partly because, as compared with the general solvents, the drying oils have higher viscosity, so that the use of a drying oil as a diluent for alkyd resin makes it necessary to add a large quantity of drying oil to the resin, and partly because the curing rate of drying oil is slower than the resin. On the basis of further study, it has now been found that 1,1-bis(1'-methyl-2'-vinyl-4',6'-heptadienoxy)alkane is suitable for use as a paint diluent.

According to the present invention, there is provided an alkyd resin composition including 90 to 10% by weight of alkyd resin and 10 to 90% by weight of 1,1-bis(1'-methyl-2'-vinyl-4',6'-heptadienoxy)alkane.

BRIEF DESCRIPTIONS OF THE DRAWINGS

DETAILED DESCRIPTION OF THE INVENTION

The 1,1-bis(1'-methyl-2'-vinyl-4',6'-heptadienoxy)alkane is a compound of the formula:

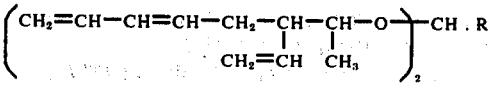

wherein R represents H or an alkyl group having from 1 to 7 carbon atoms. This compound is produced by acetal formation of 1-methyl-2-vinyl-4,6-heptadienol with an aldehyde of the general formula:

RCHO wherein R represents H or an alkyl group having from 1 to 7 carbon atoms. 1-methyl-2-vinyl-4,6-heptadienol is obtained by reacting butadiene with aldehyde in the presence of palladium complex catalyst and is represented by the formula:

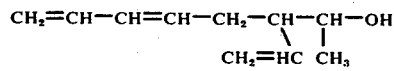

as disclosed in the pages 3813 to 3816 of "Tetrahedron Letters" No. 43 (England, 1970).

The physical properties of some 1,1-bis(1'-methyl-2'-vinyl-4',6'-heptadienoxy)alkanes are:

1,1bis(1'-methyl-2'-vinyl-4',6'-heptadienoxy)ethane

Figure 1:
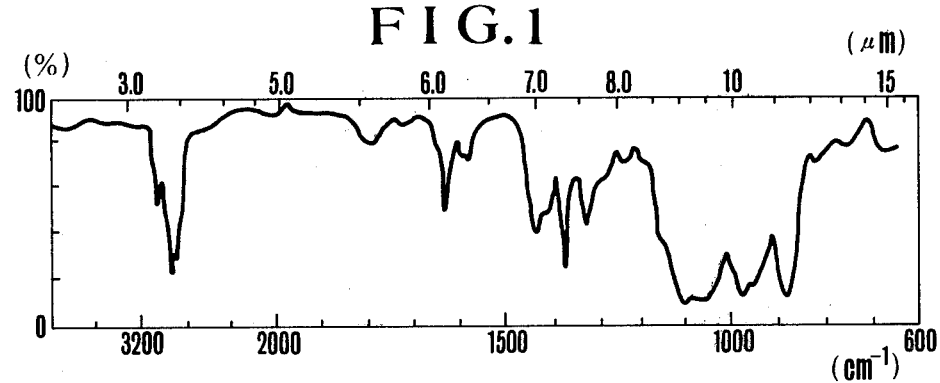
FIG. 1 shows the infrared absorption spectrum of 1,1-bis(1'-methyl-2'-vinyl-4',6'-heptadienoxy)ethane.

Boiling point: 144° to 148° C/2mmHg (315-320° C/760mmHg)
Ultra violet absorption: λmax = 229 mμ
Infrared absorption spectrum: as shown in FIG. 1
Refractive index: $n_D{}^{25}$ = 1.4903
Specific gravity: $d_4{}^{15}$ = 0.9025
Viscosity: η= 8.63 cst (centistokes) (25° C)
Molecular weight: 349 (VPO method) (Theoretical value 380.5)
NMR:
Measurement values obtained from CCl₄ solution and tetramethylsilane

| δ(CCl₄) ppm | |
| --- | --- |
| 0.95–1.30 (m) | [—CH₂(9H)] |
| 1.93–2.50 (m) | 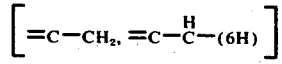 |
| 3.16–3.83 (m) | 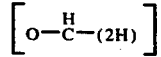 |
| 4.50–4.75 (m) | 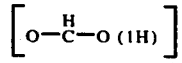 |
| 4.75–5.28 (m) | 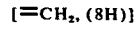 |
| 5.28–6.92 (m) | 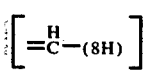 |

1,1-bis(1'-methyl-2'-vinyl-4',6'-heptadienoxy)butane

Figure 2:
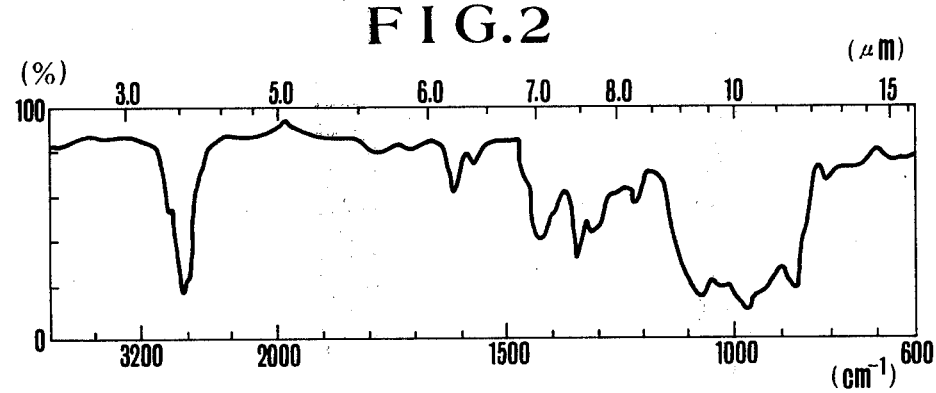
FIG. 2 shows the infrared absorption spectrum of 1,1-bis(1'-methyl-2'-vinyl-4',6'-heptadienoxy)butane.

Boiling point: More than 150° C2mmHg (more than 320° C/760mmHg)
  Ultraviolet absorption: λmax = 229 mμ
  Infrared absorption spectrum: as shown in FIG. 2
  Refractive Index: $n_D^{25} = 1.4846$
  Specific gravity: $d_4^{15} = 0.9025$
  Viscosity: η=22.1 cst (centistokes) (25° C)
  Molecular weight: 365 (VPO method) (Theoretical value 358.5)
  NMR: Measurement values obtained from CCL$_4$ solution and tetramethylsilane

| δ(CCl$_4$) ppm | |
|---|---|
| 0.68–1.23 (m) | [—CH$_2$ (9H)] |
| 1.23–1.80 (m) | [—CH$_2$—(4H)] |
| 1.80–2.53 (m) | $\left[ =C-CH_2, =C-\overset{H}{C}-, (6H) \right]$ |
| 3.20–3.80 (m) | $\left[ O-\overset{H}{C}-(2H) \right]$ |
| 4.40–4.75 (m) | $\left[ O-\overset{H}{C}-O(1H) \right]$ |
| 4.75–5.30 (m) | [=CH$_2$ (8H)] |
| 5.30–6.90 (m) | $\left[ =\overset{H}{C}-(8H) \right]$ |

1,1-bis(1'-methyl-2'-vinyl-4',6'-heptadienoxy)octane

Figure 3:
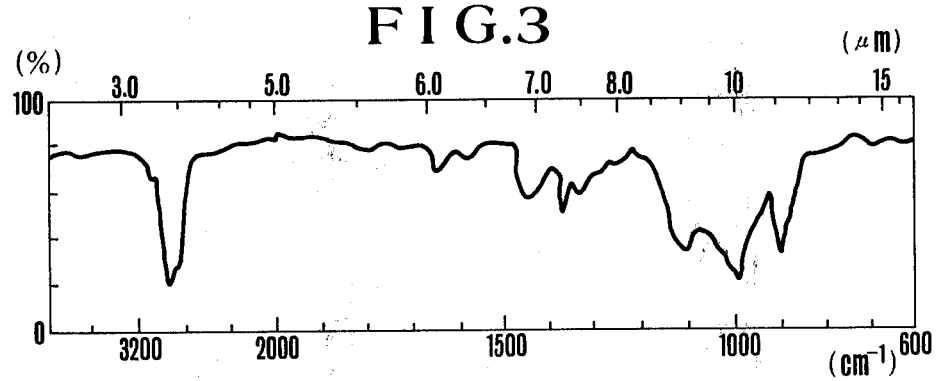
FIG. 3 shows the infrared absorption spectrum of 1,1-bis(1'-methyl-2'-vinyl-4',6'-heptadienoxy)octane.

Boiling point: More than 150° C/2mmHg (more than 320° C/760mmHg)
  Ultraviolet absorption spectrum: λmax=229 mμ
  Infrared absorption: as shown in FIG. 3
  Refractive index: $n_D^{25} = 1.4834$
  Specific gravity: $d_4^{15} = 0.8884$
  Viscosity: η=19.2 cst (centistokes) (25° C)
  Molecular weight: 413 (VPO method) (Theoretical value 414.5)
  NMR: Measurement values obtained from CCl$_4$ solution and tetramethylsilane

| δ(CCl$_4$) ppm | |
|---|---|
| 0.75–1.20 (m) | [—CH$_2$ (9H)] |
| 1.20–1.80 (m) | [—CH$_2$—(12H)] |
| 1.80–2.55 (m) | $\left[ =C-CH_2, =C-\overset{H}{C}-, (6H) \right]$ |
| 3.33–3.83 (m) | $\left[ O-\overset{H}{C}-, (2H) \right]$ |
| 4.48–4.75 (m) | $\left[ O-\overset{H}{C}-O, (1H) \right]$ |
| 4.75–5.30 (m) | [=CH$_2$ (8H)] |
| 5.30–6.73 (m) | $\left[ =\overset{H}{C}-(8H) \right]$ |

In each of FIG. 1 to FIG. 3, the vertical axis represents percent transmission and the upper horizontal axis shows wave length (micron) and the lower horizontal axis shows frequency (cm$^{-1}$).

As is apparent from the above-mentioned physical properties, the 1,1bis(1'-methyl-2'-vinyl-4',6'-heptadienoxy)alkanes, have high boiling points and low volatility as compared with other low viscosity compounds similar to the general solvents. Further, these compounds react with alkyd resin because of the two conjugated double bond groups two vinyl substituents.

The alkyd resin composition of the present invention is a mixture which can be prepared by mixing 90 to 10% by weight of alkyd resin with 10 to 90% by weight of a 1,1-bis(1'-methyl-2'-vinyl-4',6'-heptadienoxy)alkane. The quantitative limit in this case is based on the fact that if the amount of 1,1-bis(1'methyl-2'-vinyl-4',-6'-heptadienoxy)alkane exceeds 90% by weight, the physical properties of the resulting mixture when used as alkyd resin paint becomes unsuitable. If the amount is smaller than 10% by weight, the viscosity of the resulting mixture becomes so high (because of lack of a diluent) that the workability is poor. Among the 1,1-bis(1'-methyl-2'-vinyl-4',6'-heptadienoxy)alkanes, 1,1-bis(1'-methyl-2'-vinyl-4',6'-heptadienoxy)ethane is preferably used in the present invention.

The composition of the present invention, obtained as stated above, may be formulated by the incorporation of such substances as pigments, including inorganic pigments and organic pigments, and body agents (thixotropic agents) including calcium carbonate and balite, which are used for the formulation of ordinary alkyd resins. If necessary, the composition of the present invention may be admixed with a solvent serving as a thinner, whereby a solvent type paint having much lower viscosity than the conventional alkyd resin paint can be obtained.

The present invention will be further explained below in more detail by way of Examples, but the invention should not be construed as limited to these Examples.

EXAMPLE 1

Under a reduced pressure, solvents were removed from Beckosol P470-70 (the oil and fat component consists of soya-bean oil; oil length 70) produced by Nippon Reichhold Co., Ltd. and from Phthalkyd 235-50 (the oil and fat component consists of soya-bean oil; oil length 35) produced by Hitachi Kasei Co., Ltd. to isolate the resin components. At various mixing ratios as shown in Table 1, below, 1,1-bis(1'-methyl2'-vinyl-4',6'-heptadienoxy)ethane, 1,1-bis(1'-methyl-2'-vinyl-4',6'-heptadienoxy)butane and 1,1-bis(1'-methyl-2'-vinyl-4',6'-heptadienoxy)octane, were respectively added to the two kinds of alkyd resin to make clear paints. Using the testing methods of JIS K-5400 and JIS K-7777, the non-volatile contents remaining after heating the clear paints at 105° C for 2 hours as well as the physical properties of the coated paint films were measured. The results are shown in Table 1.

Table 1

Performances of a transparent paint film

| Composition | Prescription No. | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| 1,1-bis(1'-methyl-2'-vinyl-4',6'-heptadienoxy)ethane (part by weight) | 80 | 20 | 80 | 20 | — | — | — | — | — | — | — | — |
| 1,1-bis(1'-methyl-2'-vinyl-4',6'-heptadienoxy)butane (part by weight) | — | — | — | — | 80 | 20 | 80 | 20 | — | — | — | — |
| 1,1-bis(1'-methyl-2'-vinyl-4',6'-heptadienoxy)octane (part by weight) | — | — | — | — | — | — | — | — | 80 | 20 | 80 | 20 |
| Beckosol P470-70 (part by weight) | 20 | 80 | — | — | 20 | 80 | — | — | 20 | 80 | — | — |
| Phthalkyd 235-50 (part by weight) | — | — | 20 | 80 | — | — | 20 | 80 | — | — | 20 | 80 |
| 10% cobalt naphthenate solution (part by weight) | 1 | 1 | 1 | 1 | 1 | 1 | 1 | 1 | 1 | 1 | 1 | 1 |
| Characteristics | | | | | | | | | | | | |
| Curing velocity at 25° C | | | | | | | | | | | | |
| set to touch (hour) | 1.5 | 1.0 | 1.0 | 1.0 | 2.0 | 1.0 | 1.5 | 1.0 | 2.5 | 1.5 | 1.5 | 1.0 |
| dust free (hour) | 4.0 | 4.0 | 3.5 | 3.0 | 3.0 | 2.0 | 3.0 | 2.0 | 4.0 | 3.0 | 2.5 | 2.5 |
| dry to handle (hour) | 7.0 | 7.0 | 6.5 | 5.5 | 5.0 | 4.0 | 6.0 | 5.0 | 6.0 | 5.0 | 5.0 | 5.0 |
| Pencil hardness | H | H | 2H | 2H | HB | HB | HB | H | B | B | HB | HB |
| Non-volatile content % | 98.5 | 99.0 | 98.0 | 98.7 | 99.0 | 98.5 | 98.7 | 97.8 | 99.3 | 99.1 | 98.5 | 98.0 |

EXAMPLE 2

A mixture of Beckosol P470-70 and 1,1-bis(1'-methyl-2'-vinyl-4',6'-heptadienoxy)ethane, a mixture of Beckosol P470-70 and 1,1-bis(1'-methyl-2'-vinyl-4',6'-heptadienoxy)butane and a mixture of Beckosol P470-70 and 1,1-bis(1'-methyl-2'-vinyl-4',6'-heptadienoxy)octane, which were used in Example 1, were respectively admixed with titanium dioxide and a body agent in the mixing ratios as shown in Table 2 to prepare non-solvent type paints. An "alkyd resin + thinner" solvent type paint and an "alkyd resin + linseed oil" non-solvent type paint were also prepared for comparison with the above formulations.

The paints having viscosity values as shown in the Prescription Nos. 2-1 to 2-10 are easy to coat by brush. On the contrary, the paint shown in formulations No. 2-11 is difficult to apply with brush due to the high viscosity of linseed oil itself. This difficulty is greater when the linseed oil is used in an increased amount.

These paints were coated in the amount of 0.6 g/dm² on a soft steel plate, and were allowed to stand for a week. Then, the physical properties of the paint films were measured based on the method of JIS K-5400. The results are shown in Table 3 given below. As is apparent from the Table 3, the mixture of alkyd resin and 1,1-bis(1'-methyl-2'-vinyl-4',6'-heptadienoxy)alkanes, 2-1 to 2-9, have excellent physical properties comparable to the paint consisting of alkyd resin alone, 2-10 to 2-13. They are superior in salt water resistance. The paint which had been admixed with linseed oil has a non-volatile content of 100% was too soft and tacky and, therefore, was unsatisfactory as a paint.

Table 2

Formulations with Beckozol P470-70

| | Prescription No. | | | | | | | | | | | | |
|---|---|---|---|---|---|---|---|---|---|---|---|---|---|
| | The Present Invention | | | | | | | | | Comparative Example | | | |
| | 2-1 | 2-2 | 2-3 | 2-4 | 2-5 | 2-6 | 2-7 | 2-8 | 2-9 | 2-10 | 2-11 | 2-12 | 2-13 |
| Composition | | | | | | | | | | | | | |
| 1,1-bis(1'-methyl-2'-vinyl-4',6'-heptadienoxy)ethane (part by weight) | 7 | 12 | 28 | — | — | — | — | — | — | — | — | — | — |
| 1,1-bis(1'-methyl-2'-vinyl-4',6'-heptadienoxy)butane (part by weight) | — | — | — | 7 | 17.5 | 28 | — | — | — | — | — | — | — |
| 1,1-bis(1'-methyl-2'-vinyl-4',6'-heptadienoxy)octane (part by weight) | — | — | — | — | — | — | 7 | 17.5 | 28 | — | — | — | — |
| Alkyd resin (part by weight) | 28 | 23 | 7 | 28 | 17.5 | 7 | 28 | 17.5 | 7 | 35 | 3.5 | 35 | 3.5 |
| Thinner (part by weight) | — | — | — | — | — | — | — | — | — | 30.5 | — | 30.5 | — |
| Linseed oil (part by weight) | — | — | — | — | — | — | — | — | — | — | 31.5 | — | 31.5 |
| Titanium dioxide (part by weight) | 25 | 25 | 25 | 25 | 25 | 25 | 25 | 25 | 25 | 25 | 25 | 25 | 25 |
| Zinc white (part by weight) | 5 | 5 | 5 | 5 | 5 | 5 | 5 | 5 | 5 | 5 | 5 | 5 | 5 |
| Calcium carbonate (part by weight) | 20 | 20 | 20 | 20 | 20 | 20 | 20 | 20 | 20 | 20 | 20 | 20 | 20 |
| 10% cobalt naphthenate solution (part by weight) | 0.35 | 0.35 | 0.35 | 0.35 | 0.35 | 0.35 | 0.35 | 0.35 | 0.35 | 0.35 | 0.35 | 0.35 | 0.35 |
| Characteristics | | | | | | | | | | | | | |
| Viscosity (a) cps | 760 | 620 | 460 | 220 | 140 | 55 | 205 | 120 | 50 | 510 | 980 | 120 | 187 |
| Non-volatile content % | 99.2 | 99.0 | 98.4 | 99.6 | 99.3 | 100.4 | 98.9 | 99.4 | 99.9 | 73.6 | 100.0 | 73.6 | 100.0 |

Note:
(a) B-type viscosimeter, 20° C
(b) JIS K-5400

Table 3

Physical properties of paint film composed of a mixture containing of Beckozol P 470-70

| | Prescription No. | | | | | | | | | | | | |
|---|---|---|---|---|---|---|---|---|---|---|---|---|---|
| | The Present Invention | | | | | | | | | Comparative Example | | | |
| | 2-1 | 2-2 | 2-3 | 2-4 | 2-5 | 2-6 | 2-7 | 2-8 | 2-9 | 2-10 | 2-11 | 2-12 | 2-13 |
| Pencil hardness | 2H | 2H | 3H | H | 2H | 2H | H | 2H | 2H | 1H | softer than 4B | 1H | softer than 4B |
| Bending resistance mm | | | | | | | | | | | | | |

Table 3-continued

Physical properties of paint film composed of a mixture containing of Beckozol P 470-%

| Prescription No. | The Present Invention | | | | | | | | | Comparative Example | | | |
|---|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 | 2-13 |
| (Mandrel) | 2 | 2 | 2 | 2 | 2 | 2 | 2 | 2 | 2 | 2 | 2 | 2 | 2 |
| Cross cut test (a) | 100/100 | 100/100 | 100/100 | 100/100 | 100/100 | 100/100 | 100/100 | 100/100 | 100/100 | 100/100 | 95/100 | 100/100 | 95/100 |
| Impact resistance kg-cm (Du Pond system) (b) | 0.5–50 | 0.5–50 | 0.5–40 | 0.5–50 | 0.5–50 | 0.5–40 | 0.5–50 | 0.5–50 | 0.5–50 | 0.5–50 | 1–50 | 0.5–50 | 1–50 |
| Erichsen test | 7.5 | 7.5 | 7.0 | 7.7 | 7.7 | 7.0 | 8.0 | 7.7 | 7.5 | 8.0 | 8.0 | 8.0 | 8.0 |
| Water resistance | Good | Good | Good | Good | Good | Good | Good | Good | Good | Good | Good | Good | Good |
| Acid resistance | Good | Good | Good | Good | Good | Good | Good | Good | Good | Good | Good | Good | Good |
| Salt water resistance | Good | Good | Good | Good | Good | Good | Good | Good | Good | Expanded | Discolored | Expanded | Discolored |
| Weather resistance | Good | Good | Good | Good | Good | Good | Good | Good | Good | Good | Good | Good | Good |

Note:
(a) Peeling test made after the paint film was affixed with an adhesive tape.
(b) JIS K-7777

Table 4

Formulations with Phthalkyd 235-50 and the physical properties of the paint film

| Prescription No. | The present invention | | | | | Comparative Example | | |
|---|---|---|---|---|---|---|---|---|
| Mixing prescription | 3-1 | 3-2 | 3-3 | 3-4 | 3-5 | 3-6 | 3-7 | 3-8 |
| 1,1-bis(1'-methyl-2'-vinyl-4',6'-heptadienoxy)ethane (part by weight) | 7 | 28 | — | — | — | — | — | — |
| 1,1-bis(1'-methyl-2'-vinyl-4',6'-heptadienoxy)butane (part by weight) | — | — | 17.5 | 28 | — | — | — | — |
| 1,1-bis(1'-methyl-2'-vinyl-4',6'-heptadienoxy)octane (part by weight) | — | — | — | — | 17.5 | 28 | — | — |
| Alkyd resin (part by weight) | 28 | 7 | 17.5 | 7 | 17.5 | 7 | — | 35 |
| Thinner (part by weight) | — | — | — | — | — | — | 55.5 | 55.5 |
| Titanium dioxide (part by weight) | 25 | 25 | 25 | 25 | 25 | 25 | 25 | 25 |
| Zinc white (part by weight) | 5 | 5 | 5 | 5 | 5 | 5 | 5 | 5 |
| Sodium carbonate (part by weight) | 20 | 20 | 20 | 20 | 20 | 20 | 20 | 20 |
| 10% cobalt naphthenate solution (part by weight) | 0.35 | 0.35 | 0.35 | 0.35 | 0.35 | 0.35 | 0.35 | 0.35 |
| Characteristics | | | | | | | | |
| Viscosity (a) cps | 720 | 450 | 280 | 85 | 245 | 76 | 712 | 90 |
| Non-volatile content % (b) | 99.2 | 98.2 | 99.7 | 99.4 | 101.0 | 99.9 | 60.8 | 60.8 |
| Characteristics of paint film | | | | | | | | |
| Pencil hardness (b) | 2H | 2H | 2H | 2H | 2H | 2H | 2H | 2H |
| Bending resistance mm (Mandrel) (b) | 2 | 2 | 2 | 2 | 2 | 2 | 2 | 2 |
| Cross cut test (c) | 100/100 | 100/100 | 100/100 | 100/100 | 100/100 | 100/100 | 100/100 | 100/100 |
| Impact resistance kg-cm (Du pond system) (b) | 0.5–40 | 0.5–40 | 0.5–40 | 0.5–40 | 0.5–40 | 0.5–40 | 1–50 | 0.5–30 |
| Erichsen test mm (d) | 7.5 | 7.0 | 7.0 | 7.5 | 7.5 | 7.5 | 8.0 | 7.5 |
| Water resistance (b) | Good | Good | Good | Good | Good | Good | Good | Good |
| Acid resistance (b) | Good | Good | Good | Good | Good | Good | Good | Good |
| Salt water resistance (b) | Good | Good | Good | Good | Good | Good | expanded | expanded |
| Weather resistance (b) | Good | Good | Good | Good | Good | Good | Good | Good |

Note:
(a) B-type viscosimeter, 20° C
(b) JIS K-5400
(c) A peeling test made after the film was affixed with an adhesive tape.
(d) JIS K-7777 o

EXAMPLE 3

To samples of the 100% Phthalkyd 235–50 resin used in Example 1 were respectively aded, 1,1-bis(1'-methyl-2'-vinyl-4',6'-heptadienoxy)ethane, 1,1-bis(1'-methyl-2'-vinyl-4',6'-heptadienoxy)butane and 1,1-bis(1'-methyl-2'-vinyl-4',6'-heptadienoxy)octane to prepare non-solvent type paints similar to those of Example 2. Measurements were made of the physcial properties of the paint and the performances of the paint film. The results are shown in Table 4 given below. In the resin composition of the present invention, the content of volatile material which evaporated in 2 hours at about 105° C was extremely low. In other words, the content of non-volatile material was high. In addition, the paints of this Example had a film quality comparable to the paints of the Comparative Example.

What is claimed is:

1. An alkyd resin composition comprising 90 to 10% by weight of an alkyd resin and 10 to 90% by weight of a 1,1-bis(1'-methyl-2'-vinyl-4',6'-heptadienoxy)alkane of the formula:

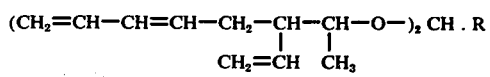

wherein R IS H or an alkyl group having 1 to 7 carbon atoms.

2. The composition according to claim 1, wherein said 1,1-bis(1'-methyl-2'-vinyl-4',6'-heptadienoxy)alkane is 1,1-bis(1'-methyl-2'-vinyl-4', 6'-heptadienoxy)ethane.

3. The composition according to claim 1, wherein said 1,1-bis(1'-methyl-2'-vinyl-4',6'-heptadienoxy)alkane is 1,1-bis(1'-methyl-2'-vinyl-4',6'-heptadienoxy)butane.

4. The composition according to claim 1, wherein said 1,1-bis(1'-methyl-2'-vinyl-4',6'-heptadienoxy)alkane is 1,1-bis(1'-methyl-2'-vinyl-4',6'-heptadienoxy)octane.

* * * * *

UNITED STATES PATENT OFFICE
CERTIFICATE OF CORRECTION

Patent No. 4,021,390            Dated May 3, 1977

Inventor(s) SATORU ENOMOTO ET AL

It is certified that error appears in the above-identified patent and that said Letters Patent are hereby corrected as shown below:

Column 1, line 59, change "DESCRIPTIONS" to --DESCRIPTION--.
Column 3, line 3, change "C2mmHg" to --$C/^2$mmHg--.
Column 7, line 54, change "aded" to --added--.

Signed and Sealed this

Thirteenth Day of September 1977

[SEAL]

Attest:

RUTH C. MASON
Attesting Officer

LUTRELLE F. PARKER
Acting Commissioner of Patents and Trademarks